United States Patent [19]

Landais et al.

[11] Patent Number: 5,791,526
[45] Date of Patent: Aug. 11, 1998

[54] AUTOMATIC GROUND MATTER DISPENSER

[75] Inventors: Francis Pierre Jacques Landais, deceased, late of Mamers, by Pierre Chevalier, legal representative; Gilles Gerard Albert Victor Morin, Alencon, both of France

[73] Assignee: Moulinex S.A., Bagnolet, France

[21] Appl. No.: 666,349

[22] PCT Filed: Dec. 6, 1994

[86] PCT No.: PCT/FR94/01416

§ 371 Date: Aug. 7, 1996

§ 102(e) Date: Aug. 7, 1996

[87] PCT Pub. No.: WO95/17120

PCT Pub. Date: Jun. 29, 1995

[30] Foreign Application Priority Data

Dec. 20, 1993 [FR] France .................. 93 15319

[51] Int. Cl.⁶ .................................................. B67D 5/06
[52] U.S. Cl. .................... 222/185.1; 222/325; 222/333; 222/370
[58] Field of Search ................... 222/185.1, 325, 222/333, 368, 370, 444

[56] References Cited

U.S. PATENT DOCUMENTS 3,554,406  1/1971  Kleysteuber ............... 222/370 X
4,747,524  5/1988  Krambrock ............... 222/370 X
5,480,068  1/1996  Frazier et al. ............ 222/325 X

FOREIGN PATENT DOCUMENTS 0 331 271  9/1989  European Pat. Off. .
1431228    1/1966  France .
2641762    3/1977  Germany ............... 222/185.1
93 01 949  9/1989  Germany .

Primary Examiner—Joseph Kaufman
Attorney, Agent, or Firm—Young & Thompson

[57] ABSTRACT

A dispenser comprises a ground grain container positioned in a matching seat recess in a housing and at least one blade rotated by a motor in the housing and capable of transferring, on rotation, a measure of ground grains through a flow aperture in the container to an outlet in the housing seat recess. The container is removably fitted into the seat recess of the housing through the use of two rotary, mutual coupling elements located at the bottom of the container and at the base of the seat recess of the housing respectively, and connected to the blade and to the motor respectively. The container also comprises elements for closing the flow aperture when the motor is stopped and for opening it when the motor is started. The dispenser is particularly useful in automatic coffee machines.

10 Claims, 4 Drawing Sheets

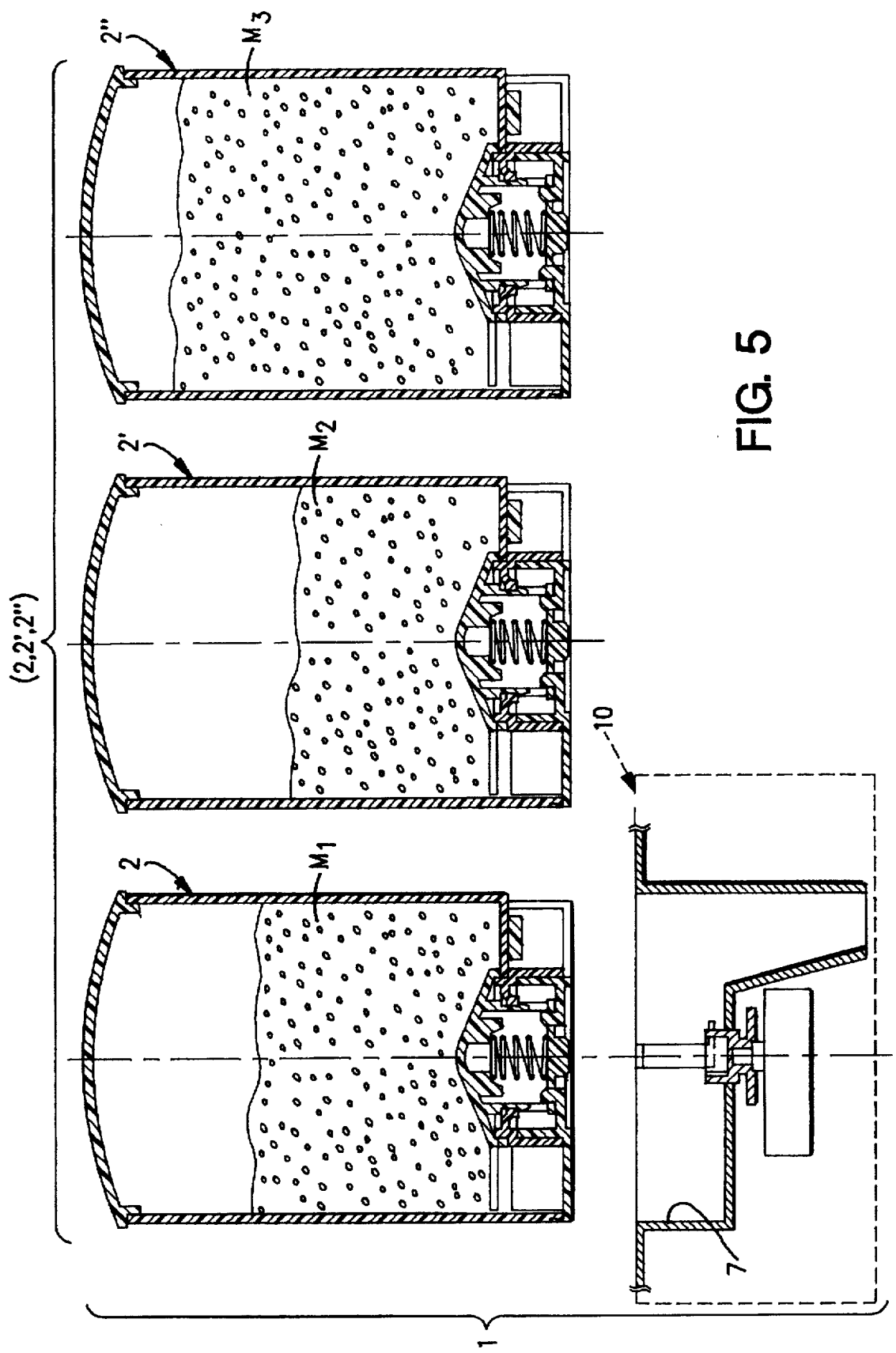

AUTOMATIC GROUND MATTER DISPENSER

FIELD OF THE INVENTION

The present invention concerns an automatic ground matter dispenser having a reservoir comprising a bottom and a lateral wall, containing a quantity of ground matter and positioned in a seat of complementary shape produced in the top part of a casing, and at least one rotating blade positioned in the bottom of the reservoir, rotated by a motor unit housed in the casing, and suitable, when it turns, for transferring through an outflow opening formed in the reservoir a given quantity of ground matter to an outlet produced in the seat of the casing and communicating with the opening in the reservoir.

BACKGROUND OF THE INVENTION

In known dispensers of this type, notably but not exclusively mounted on automatic coffee machines, the reservoir containing the ground matter is positioned non-removably in the seat of the casing, which forms an integral part of the machine. Such a dispenser with a non-removable reservoir is able to be used with different types of ground matter, that is to say ground matter with different particle sizes, of the same product in powder form, but without it being possible for the user to change the type of ground matter as he pleases whilst the reservoir is not empty, which makes it a dispenser the use of which is particularly limiting for any user wishing to change the type of ground matter.

The invention aims notably to overcome this drawback and to produce an automatic ground matter dispenser which enables the user to change when desired the type of ground matter of the same product in powder form even before the reservoir is empty, and this in a simple and efficacious manner.

SUMMARY OF THE INVENTION

According to the invention, an automatic ground matter dispenser of the type disclosed above is more particularly characterised in that the reservoir is removably mounted in the seat of the casing by means of at least two separable rotating mutual coupling devices which are arranged respectively in the bottom of the reservoir and in the bottom of the seat of the casing, and which are coupled in rotation respectively to the blade and to the motor unit, the reservoir also comprising means adapted, on the one hand, to close off the opening in the reservoir when the motor unit is stopped, and on the other hand to free this opening when the motor unit is started up.

By means of this embodiment, it will be understood that the user can, at any time, remove the reservoir already in place which does not contain the type of ground matter required, and fit another identical reservoir in its place which contains the type of ground matter required. Furthermore, the fitting and removal of the reservoir are particularly easy, which helps to produce a dispenser which is convenient to use for the user.

BRIEF DESCRIPTION OF THE DRAWINGS

The characteristics and advantages of the invention will, moreover, emerge from the description that follows of a particular embodiment taken by way of non-limitative example and illustrated in the accompanying drawings, in which:

FIG. 5 is a view identical to FIG. 4, to a smaller scale, illustrating three chosen reservoirs each containing a given type of ground matter.

DETAILED DESCRIPTION OF THE INVENTION

Hereinafter, the automatic ground matter dispenser in accordance with the invention will be described in terms of the dispensing of ground coffee, it being understood that such a dispenser can also be used to dispense ground matter of any other kind, for example flour, without falling outside the scope of the invention.

Figure 1:
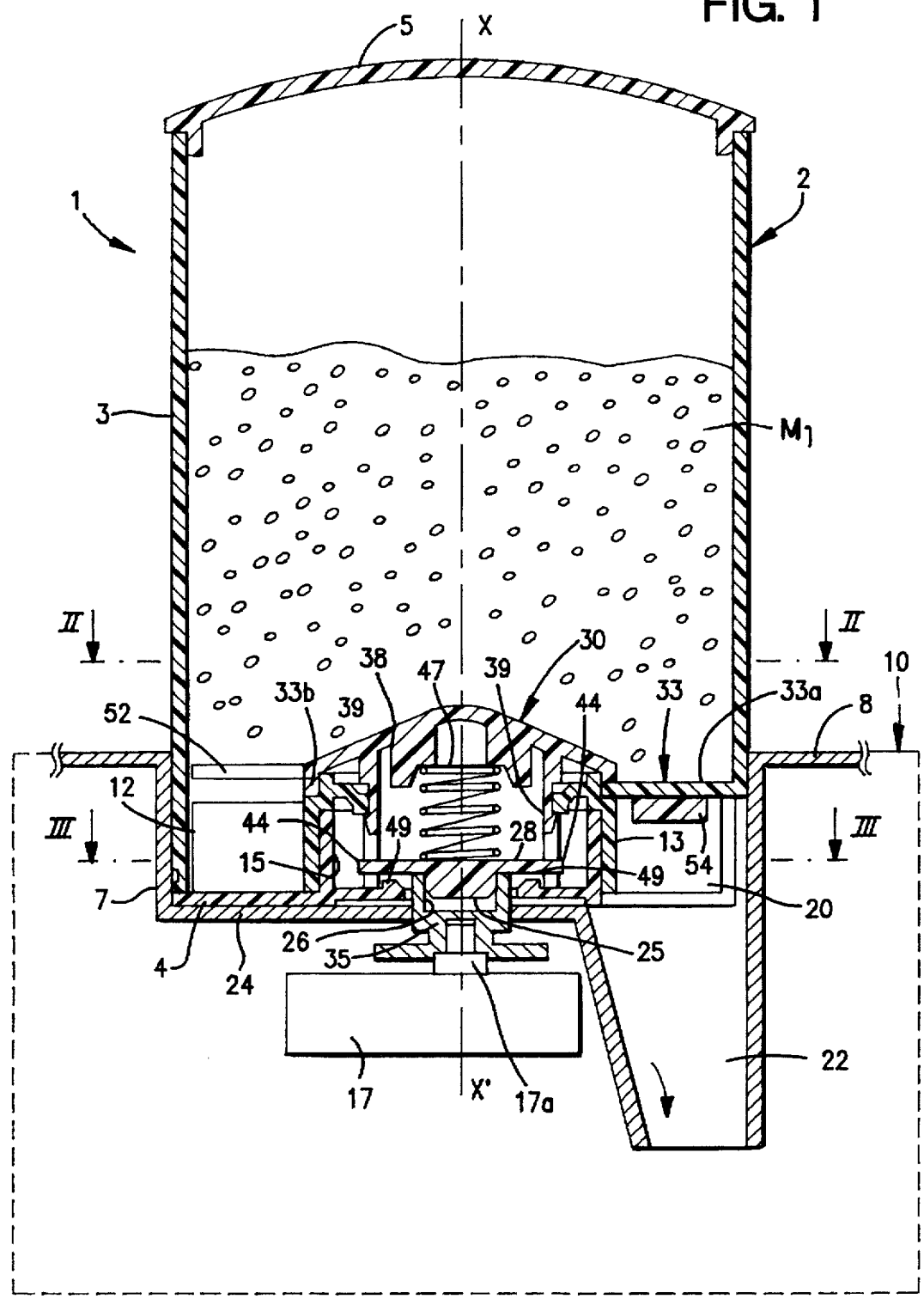
FIG. 1 is a view in vertical cross section of an automatic ground matter dispenser according to the invention, showing a ground matter reservoir in the fitting position.

In the example embodiment illustrated in FIG. 1, the ground matter dispenser 1 includes a reservoir 2 of cylindrical shape overall about an axis XX', having a lateral wall 3, a removable bottom 4 and a removable sealing lid 5, and containing a quantity of ground coffee $M_1$ with a particle size adapted to the coffee required by the user, such as for example ground coffee adapted to a coffee of the "long" type.

The reservoir 2 is fitted, in its bottom part, in an annular reception seat 7 produced in the top part 8 of a casing 10, depicted diagrammatically in dotted lines in FIG. 1, forming an integral part of an automatic coffee machine (not shown). To this end, the reservoir 2 is held in place in the seat 7 of the casing 10 by means of any appropriate reversible fixing system such as a bayonet system for example as illustrated partially at 11 in FIG. 4.

Figure 3:
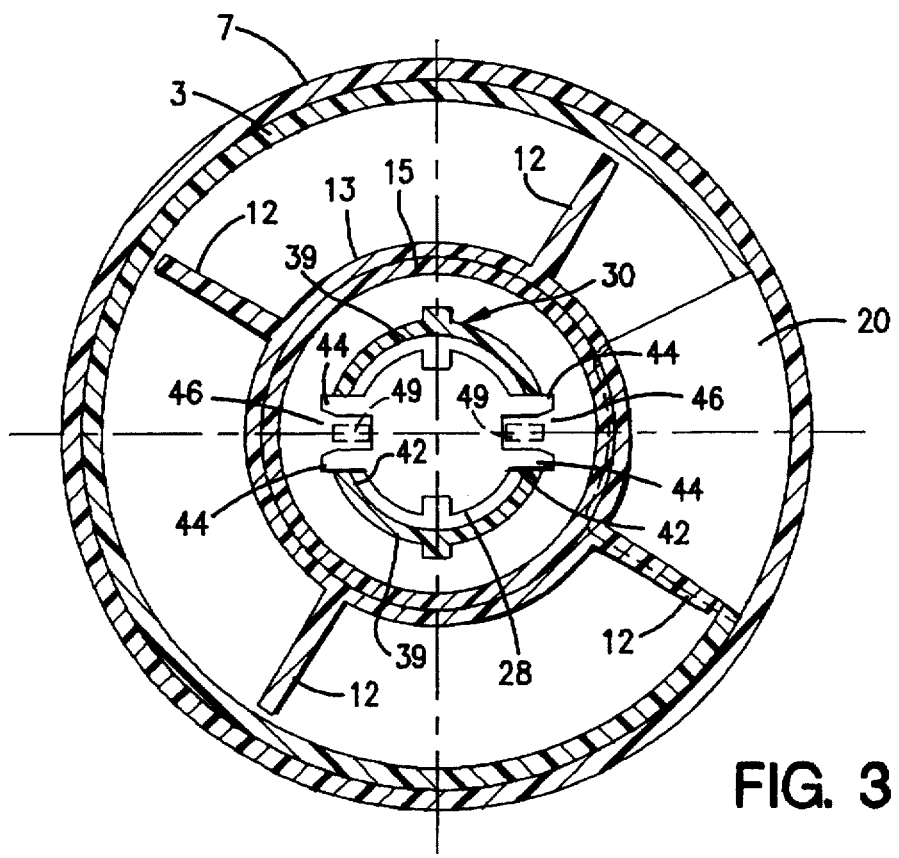
FIG. 3 is a view in cross section along the line III—III in FIG. 1.

In this example, the reservoir 2 has in its bottom 4 a plurality of rotating radial blades 12, in this case four in number as can be seen in FIG. 3, which are regularly distributed along a hollow cylindrical body 13 mounted so as to rotate coaxially about an annular cradle 15 centered on the axis XX' and formed from the bottom 4 of the reservoir, which extend substantially to the periphery of the lateral wall 3 of the reservoir 2, and which are designed to be driven, through a rotating coupling mechanism which will be described hereinafter, by a geared motor unit 17 housed in the casing 10 so as to transfer, through an outflow opening formed laterally in the bottom of the reservoir 2 in a manner which will be specified below, a predetermined measure of ground coffee $M_1$ to a discharge chute 22 oriented towards the bottom, formed laterally in the bottom 24 of the seat 7 and communicating directly with the outflow opening 20.

According to the invention, the reservoir 2 is removably mounted in the seat 7 of the casing 10 by means of two separable rotating mutual coupling devices 25, 26 which are coupled in rotation respectively to the blades 12 and to the motor unit 17, the reservoir 2 also including means adapted, on the one hand, to close off its opening 20 when the motor unit 17 is stopped, and on the other hand, to free this same opening 20 when the motor unit 17 is started up.

In the example embodiment illustrated in FIG. 1, one of the two mutual coupling devices, namely that marked 25, consists of a stud formed on the bottom face of a round plate 28 arranged coaxially in the annular cradle 15 and rotatably mounted in a coupling component 30 which is fixed to the body 13 supporting the blades 12 by means of suitable fixing elements, and which is itself mounted so as to rotate about the axis XX', on a support component 33 fixed to the reservoir 2. The other coupling device 26, for its part, consists of a recess which is formed in a rotating component forming a driving device 35 passing axially through the bottom 24 of the seat 7 and the bottom 4 of the reservoir 2 and fixed to the output shaft 17a of the motor unit 17, and in which is closely engaged, for example by reversible snapping-in, the stud 25 on the plate 28.

In this example, the coupling component 30 has a dome-shaped top wall 38 designed to facilitate the descent of the ground matter $M_1$ towards the bottom 4 of the reservoir 2, and two semi-cylindrical lateral walls 39, visible in cross section in FIG. 3, oriented so as to face each other and separated over their whole height by two slots 42 in each of which there is disposed, bearing against the respective extreme edges of the lateral walls 39, a pair of drive fingers 44 extending radially from the plate 28 and forming between them a notch 46 extending over the whole height of the plate 28, see FIG. 3.

Figure 4:
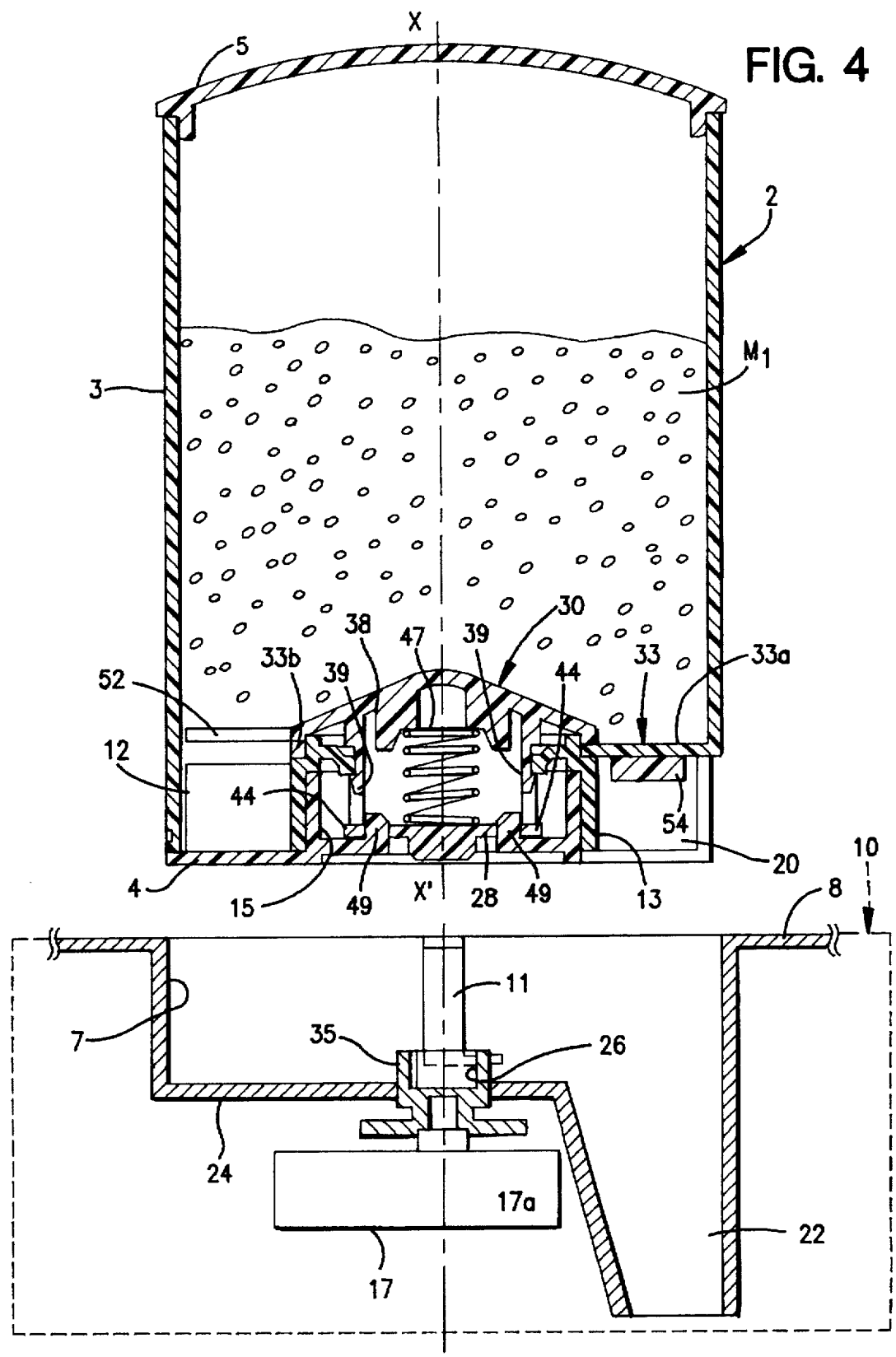
FIG. 4 is a view identical to FIG. 1, showing the ground matter reservoir in the removal position.

As can be seen in FIG. 1, a spiral spring 47 is interposed, on the axis XX', between the top wall 38 of the coupling component 30 and the top face of the plate 28; the bottom 4 of the reservoir 2 is, moreover, provided with two identical lugs 49 directed upwards and designed, on the one hand, to engage in the two notches 46 in the plate 28 under the action of the return force of the spring 47 when the reservoir 2 is withdrawn, thereby locking the plate as illustrated in FIG. 4, and on the other hand to be released from the two notches 46 in the plate 28 counter to the return force of the spring 47 when the reservoir 2 is put in place, thereby unlocking the plate as illustrated in FIG. 1.

Figure 2:
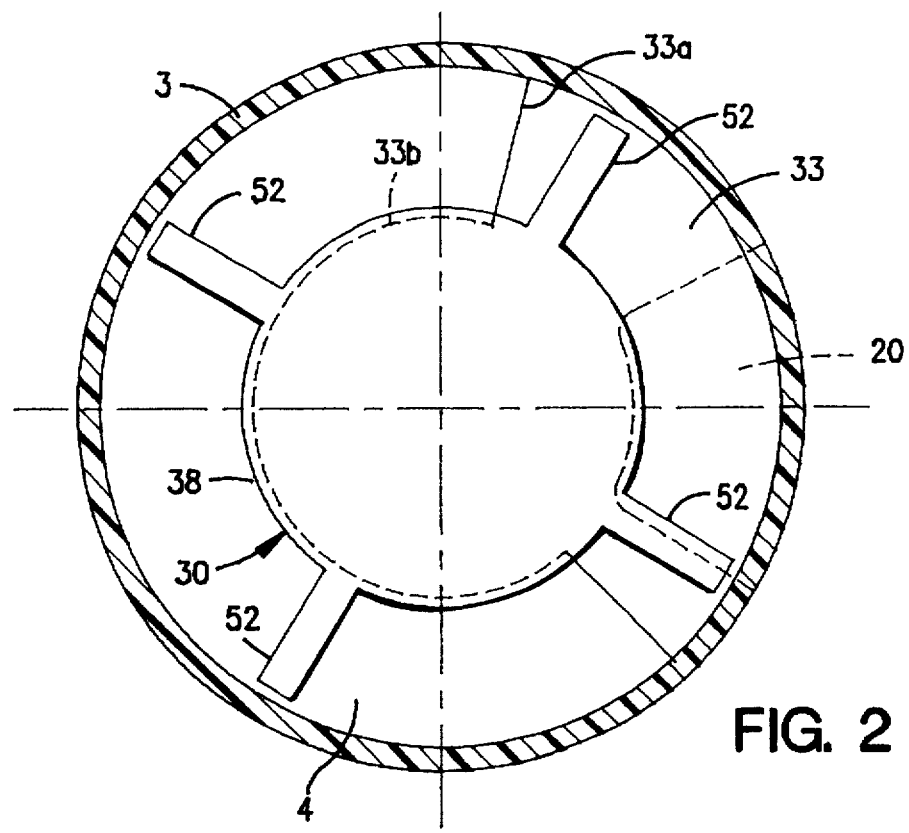
FIG. 2 is a view in cross section along the line II—II in FIG. 1.

Looking at FIGS. 1 and 2, the support component 33 designed to hold the coupling component 30 in place consists of a flat wing which is formed from the lateral wall 3 of the reservoir 2, substantially at the same height as the blades 12, extending parallel to the bottom 4 of the reservoir (FIG. 1), and which has a section 33a in the shape of a circular sector (FIG. 2) extended by an annular section 33b depicted in dotted lines in FIG. 2; this annular section 33b braces the top part of the body 13 supporting the blades and the top wall 38 of the coupling component 30, as can be seen in FIG. 1.

In order to drop the ground matter $M_1$ present in the section 33a of the flat wing 33 into the bottom of the reservoir 2, the top wall 38 of the coupling component 30 is provided, to this end, with a plurality of rotating radial blades 52, in this case four in number, as can be seen in FIG. 2, distributed regularly and extending substantially to the periphery of the lateral wall 3 of the reservoir.

Looking at FIGS. 1, 2 and 3, the outflow opening 20 is now formed by a cut-out formed both in the lateral wall 3 of the reservoir, between the flat wing 33 and the bottom 4 of the reservoir, and in the bottom 4 of the reservoir along a small circular sector.

In the outflow opening 20, in FIG. 1, there is disposed a flexible tab 54 fixed on the bottom face of the section 33a of the flat wing 33 by any appropriate fixing means, and designed to assist, by sweeping and guiding, an even continuous flow of the ground matter $M_1$ into the discharge chute 22. The ground matter liable to be deposited on the edge of the blades 12 is, in fact, swept by the flexible tab 54 as the blades 12 rotate.

In the example embodiment illustrated in FIG. 1, the blades 12 positioned in the bottom of the reservoir 2 are substantially of the same height as the outflow opening 20 and are indexed so that two of them, once the motor unit 17 has stopped, come to border on the opening 20, as can be seen in FIG. 3, thereby preventing the ground matter $M_1$ from flowing out of the reservoir. These two blades 12 therefore close off the opening 20 when the motor unit 17 stops, and free this opening 20 when they are driven by the motor unit 17 once it has been started up.

Preferably, the indexing of the blades 12 is effected by at least one microswitch (not shown) dependant on the motor unit 17.

In FIG. 5, by way of example, in no way limitative, a series of three identical reservoirs 2, 2' and 2", as described previously in relation to the reservoir 2, but each containing ground coffee with a different particle size adapted to the coffee required by the user, and designed to be mounted in the seat 7 of the casing 10 as the user chooses, has been depicted. Thus, for example, the reservoir 2 containing, as has been seen with reference to FIG. 1, the ground matter $M_1$ adapted to a coffee of the "long" type, the reservoir 2' contains ground matter $M_2$ adapted to a coffee of the "espresso" type and the reservoir 2" contains ground matter $M_3$ adapted to a decaffeinated coffee.

Looking at FIG. 1, in which the reservoir 2 contains the ground matter $M_1$, the functioning of the ground coffee dispenser 1 in accordance with the invention is as follows.

The plate 28, rotated by the motor unit 17 through the driving device 35, itself rotates, through its fingers 44 (FIG. 3), the coupling component 30 and the four blades 52 which it carries so as to drop the ground matter $M_1$ present on the flat wing 33, the connecting component 30 itself rotating the four blades 12 carried by the body 13 fixed to the coupling component 30. The four blades 12 stir the ground coffee $M_1$ and eject a predetermined measure of ground matter through the opening 20, the ground matter $M_1$ then flowing into the discharge chute 22 in an even, continuous manner by virtue of the tab 54.

Once the predetermined measure of ground matter $M_1$ has been dispensed, the stopping of the motor unit 17 firstly positions the four blades 12 so that two of them border on the opening 20 so as to prevent any flow of the ground matter $M_1$, and secondly places the two notches 46 in the plate 28 opposite the two lugs 49 on the bottom 4 of the reservoir.

The changing of the reservoir 2 containing the ground matter $M_1$, for example for the reservoir 2' (FIG. 5) which for its part contains the ground matter $M_2$ adapted to the coffee required by the user, namely a coffee of the "espresso" type in the example chosen, is performed in the following manner.

The user slightly turns the reservoir 2 and extracts it from the seat 7 of the casing 10 by separating the two coupling devices 25, 26, the two lugs 49 on the bottom 4 of the reservoir then coming to be engaged in the two notches 46 in the plate 28 which is pushed towards the bottom 4 of the reservoir under the action of the spring 47, as illustrated in FIG. 4. The user then puts the reservoir 2' containing the ground matter $M_2$ in place in the seat 7 of the casing 10 with the stud 25 closely engaged in the recess 26, the two lugs 49 on the bottom 4 of the reservoir 2' then coming, through the action of the edge of the recess of the driving device 35 on the movable plate 28, to be released from the two notches 46 in the plate 28 pushed counter to the spring 47. Preferably, the reservoir 2, once extracted and containing the ground matter $M_1$, is, for its part, stored in a refrigerator so that the ground matter retains all its flavour.

We claim:

1. Automatic ground matter dispenser having a reservoir (2) comprising a bottom (4) and a lateral wall (3), containing a quantity of ground matter (M₁) and positioned in a seat (7) of complementary shape produced in the top part (8) of a casing (10), and at least one rotating blade (12) positioned in the bottom (4) of the reservoir (2), rotated by a motor unit (17) housed in the casing (10), and suitable, when it turns, for transferring through an outflow opening (20) formed in the reservoir a given quantity of ground matter to an outlet (22) produced in the seat of the casing and communicating with the opening (20) in the reservoir, said reservoir (2) being removably mounted in the seat (7) of the casing (10) by means of at least two separable rotating mutual coupling devices (25, 26) which are arranged respectively in the bottom of the reservoir (2) and in the bottom of the seat (7) of the casing (10), and which are coupled in rotation respectively to the blade (12) and to the motor unit (17), said reservoir (2) also comprising means adapted, on the one hand, to close off the opening (20) in the reservoir when the motor unit (17) is stopped, and on the other hand to free this opening (20) when the motor unit (17) is started up.

2. Automatic ground matter dispenser according to claim 1, wherein the two mutual coupling devices (25, 26) consist respectively of a stud (25) formed on the bottom face of a rotating round plate (28) mounted, so as to move elastically, about the axis (XX') of the reservoir (2), in a coupling component (30) connected to the blade and mounted so as to rotate about the axis of the reservoir on a support component (33) fixed to the reservoir (2), and a suitable recess (26) which is formed in a rotating component forming a driving device (35) passing axially through the bottom (24) of the seat (7) of the casing and the bottom (4) of the reservoir (2) and fixed to an output shaft of the motor unit (17), and in which the stud (25) is closely engaged, said plate (28) coming into the position of elastic return against the bottom of the reservoir (2) when the latter is removed.

3. Automatic ground matter dispenser according to claim 2, wherein the coupling component (30) has a circular top wall (38) and two semi-cylindrical lateral walls (39), oriented so as to face each other and separated by two vertical slots (42) in each of which there is disposed, bearing against respective extreme edges of the lateral walls, at least one drive finger (44) extending radially from the plate (28), a return spring (47) being interposed between the top wall of the coupling component (30) and the top face of the plate (28).

4. Automatic ground matter dispenser according to claim 3, wherein two pairs of drive fingers (44) are disposed respectively in the two slots (42) in the coupling component (30) and are each separated by a notch (46) extending over the whole height of the plate (28), and in that the bottom (4) of the reservoir (2) has two lugs (49) directed upwards and designed, on the one hand, to engage in the two notches (46) in the plate under the action of the return force of the spring (47) when the reservoir is withdrawn, thereby locking the plate (28), and on the other hand to be released from the two notches (46) counter to the return force of the spring (47) when the reservoir is put in place, thereby unlocking the plate (28).

5. Automatic ground matter dispenser according to claim 3, wherein the top wall (38) of the coupling component (30) is in the shape of a dome, so as to facilitate the dropping of the ground matter (M₁) to the bottom of the reservoir (2).

6. Automatic ground matter dispenser according to claim 3, wherein the reservoir (2) has a generally cylindrical shape, the blade (12) extends radially, substantially as far as the periphery of the lateral wall (3) of the reservoir (2), along a hollow cylindrical body (13) mounted coaxially about an annular cradle (15) formed from the bottom (4) of the reservoir (2), coaxially with the two lateral walls (39) of the coupling component (30) and at a slight radial distance from them, the top edge of the body (13) and the two lateral walls of the coupling component (30) having cooperating fixing means.

7. Automatic ground matter dispenser according to claim 6, wherein the body (13) is provided with a plurality of identical radial blades (12) distributed regularly about the body, the support component (33) consists of a flat wing which is formed from the lateral wall (3) of the reservoir (2), substantially at the same height as the blades (12), which extends parallel to the bottom (4) of the reservoir (2), and which has a section in the shape of a circular sector (33a) extended by an annular section (33b) bracing the top part of the body (13) and the top wall of the coupling component (30), and the outflow opening (20) for the ground matter consists of a cut-out formed both in the lateral face (3) of the reservoir (2), between the flat wing (33) and the bottom (4) of the reservoir, and in the bottom (4) of the reservoir (2) along a small circular sector, the blades (12) being indexed so that two of them, once the motor unit (17) has stopped, come to border on the opening (20), so as to prevent any flow of ground matter from the reservoir, these two blades constituting the means designed, on the one hand, to close off the opening (20) in the reservoir when the motor unit (17) stops, and, on the other hand, to free this opening (20) when the motor unit (17) is started up.

8. Automatic ground matter dispenser according to claim 7, wherein the top wall (38) of the coupling component (30) is extended radially, substantially to the periphery of the lateral wall (3) of the reservoir (2), by at least one additional blade (52) designed to drop the ground matter (M₁) present on the section in the form of a circular sector (33a) of the flat wing (33) into the bottom of the reservoir (2).

9. Automatic ground matter dispenser according to claim 7, wherein the section in the form of a circular sector (33a) of the flat wing (33) carries on its bottom face a flexible tab (54) extending into the outflow opening (20) and serving as a wiper and guide for the ground matter coming from the reservoir (2).

10. Automatic ground matter dispenser according to claim 1, wherein the reservoir (2) forms part of a series of identical reservoirs (2, 2', 2") each containing a ground matter (M₁, M₂, M₃) with a different particle size.

* * * * *